(12) United States Patent
Knoedl (10) Patent No.: US 10,182,622 B2
(45) Date of Patent: Jan. 22, 2019

(54) PLUG-IN TONGUE FOR A SAFETY BELT (71) Applicant: TRW Automotive GmbH, Alfdorf (DE)

(72) Inventor: Ralf Knoedl, Alfdorf (DE)

(73) Assignee: TRW Automotive GmbH (DE)

( * ) Notice: Subject to any disclaimer, the term of this patent is extended or adjusted under 35 U.S.C. 154(b) by 536 days.

(21) Appl. No.: 14/769,545

(22) PCT Filed: Feb. 18, 2014

(86) PCT No.: PCT/EP2014/000437
§ 371 (c)(1),
(2) Date: Aug. 21, 2015

(87) PCT Pub. No.: WO2014/127910
PCT Pub. Date: Aug. 28, 2014

(65) Prior Publication Data
US 2016/0000190 A1 Jan. 7, 2016

(30) Foreign Application Priority Data

Feb. 25, 2013 (DE) .......... 10 2013 003 109

(51) Int. Cl.
*A44B 11/10* (2006.01)
*B60R 22/185* (2006.01)
(Continued)

(52) U.S. Cl.
CPC .......... *A44B 11/10* (2013.01); *A44B 11/2534* (2013.01); *A44B 11/2557* (2013.01);
(Continued)

(58) Field of Classification Search
CPC . Y10T 24/4019; Y10T 24/4084; A44B 11/10; A44B 11/2561; A44B 11/2534; A44B 11/2557; B60R 22/1855
See application file for complete search history.

(56) References Cited

U.S. PATENT DOCUMENTS 4,184,234 A * 1/1980 Anthony ............ A44B 11/2557
24/171
5,138,749 A 8/1992 McCune et al.
2011/0119874 A1* 5/2011 Dziengowski ..... A44B 11/2561
24/181

FOREIGN PATENT DOCUMENTS

DE 4226881 2/1993
DE 102004023394 12/2005
(Continued)

*Primary Examiner* — Abigail E Troy
(74) *Attorney, Agent, or Firm* — Tarolli, Sundheim, Covell & Tummino LLP (57) ABSTRACT A plug-in tongue (10) for a seat belt includes an inserting portion (12) adapted to be inserted in a belt buckle and a deflecting portion (14) for a webbing (16). The deflecting portion (14) includes a webbing passage (20) as well as a clamping element (22) for the webbing (16). The clamping element (22) can be displaced between a home position in which the webbing (16) is freely movable and a locking position in which the clamping element (22) is displaced against a wall (30) of the webbing passage (20) such that the webbing (16) is clamped between the clamping element (22) and the wall (30) of the webbing passage (20). The webbing passage (20) extends substantially in the longitudinal direction (L) or at an acute angle with the longitudinal direction (L) of the plug-in tongue (10). The clamping element (22) is displaceable at an acute angle with the webbing passage (20) and/or with the longitudinal direction (L) of the plug-in tongue (10) from the deflecting position into the locking position.

12 Claims, 5 Drawing Sheets (51) Int. Cl.
  *A44B 11/25* (2006.01)
  *B60R 22/00* (2006.01)
  *B60R 22/18* (2006.01)
(52) U.S. Cl.
  CPC .......... *A44B 11/2561* (2013.01); *B60R 22/00* (2013.01); *B60R 22/1855* (2013.01); *B60R 2022/1812* (2013.01); *Y10T 24/4019* (2015.01); *Y10T 24/4084* (2015.01)

(56) References Cited

FOREIGN PATENT DOCUMENTS

KR  20120088976  8/2012
WO  2005115192  12/2005

\* cited by examiner

PLUG-IN TONGUE FOR A SAFETY BELT

RELATED APPLICATIONS

This application corresponds to PCT/EP2014/000437, filed Feb. 18, 2014, which claims the benefit of German Application No. 10 2013 003 109.5, filed Feb. 25, 2013, the subject matter of which are incorporated herein by reference in their entirety.

BACKGROUND OF THE INVENTION

The invention relates to a plug-in tongue for a seat belt comprising an inserting portion adapted to be inserted into a belt buckle and a deflecting portion for a belt webbing, wherein the deflecting portion includes a webbing passage as well as a clamping element for the webbing and wherein the clamping element is displaceable between a home position in which the webbing is freely movable and a looking position in which the clamping element is displaced against a well of the webbing passage so that the webbing is clamped between the clamping element and the wall of the webbing passage.

In three-point belts plug-in tongues form a deflecting point between a first portion of the seat belt which in the case of restraint retains the pelvis of the vehicle occupant and a second portion which protects the thorax of the vehicle occupant against forward displacement. The plug-in tongue is threaded with the deflecting portion onto the webbing of the seat belt so that the plug-in tongue can be freely displaced along the webbing, in this way the length of the two portions of the seat belt can be adapted to the vehicle occupant during the fastening operation. In addition, by shifting the webbing by the plug-in tongue the webbing can be aligned so that it is evenly adjacent to the vehicle occupant.

In the case of restraint, the thorax may happen to move forward when the seat belt is locked. Since the webbing is movably guided in the plug-in tongue, the webbing can be displaced so that the portion adjacent to the thorax is lengthened and the portion adjacent to the pelvis is shortened causing the seat belt to pinch in the pelvis region. In order to prevent this, plug-in tongues include clamping elements which can be displaced during locking of the seat belt between a home position in which the webbing is freely movable and a locking position in which the clamping element clamps the webbing to the plug-in tongue so that no webbing displacement is possible between the first and second portions of the seat belt. In this way, the pelvis region is protected from pinching of the seat belt and the thorax is protected from excessive forward displacement.

In the plug-in tongues known, for example, from DE 10 2004 023 394 A1 the webbing passage in which the clamping element is moved into the locking position extends transversely to the longitudinal direction of the plug-in tongue. In the case of restraint, the webbing is forced against the clamping element by the tensile force acting on the webbing. When the webbing is displaced vis-à-vis the plug-in tongue, for example by increased tension on the thorax section, the clamping element is drawn by the webbing into the webbing passage due to the increased friction between the clamping element end the webbing, until the clamping element locks the webbing. The clamping element thus is moved only when the webbing moves in the plug-in tongue.

SUMMARY OF THE INVENTION

It is the object of the invention to provide a plug-in tongue for a seat belt that enables reliable and quicker locking of the seat belt by a clamping element.

For achieving the object, in a plug-in tongue of the type described in the beginning the webbing passage substantially extends in the longitudinal direction or at an acute angle with the longitudinal direction of the plug-in tongue, and the clamping element is displaceable from the deflecting position to the locking position at an acute angle with the webbing passage and/or with the longitudinal direction of the plug-in tongue. According to the invention, the webbing is deflected by the clamping element and guided into the webbing passage. In a case of restraint, both portions of the webbing are drawn in the direction of the webbing passage, causing the clamping element wrapped by the webbing to be moved by force in the direction of the webbing passage and thus in the locking position. Hence the movement of the clamping element is not brought about by the friction between the webbing and the clamping element but the clamping element is wrapped by the webbing so that it is automatically drawn into the locking position by the webbing doe to the tensile forces acting in the case of restraint. The tensile forces acting on the webbing can be completely used to displace the clamping element. Thus already in the case of lower forces acting on the webbing a displacement of the clamping element is possible so that the webbing is already clamped at the plug-in tongue even with lower restraining forces. In addition, for moving the clamping element no slipping of the webbing through the plug-in tongue is required. The clamping element is displaced immediately when the tensile force acting on the webbing is increased and not only when the webbing is displaced relative to the plug-in tongue.

At the deflecting portion preferably a guide for the clamping element is provided which is formed especially by guiding passages extending at an acute angle with the webbing passage and/or with the longitudinal direction. This guide defines the direction of movement of the clamping element at the plug-in tongue so that quick and reliable clamping of the webbing can take place.

In order to prevent, in the case of low tensile forces acting on the webbing as they occur during regular use of the seat belt, the clamping element from being released or from being displaced, respectively, preferably at least one securing element is provided for retaining the deflecting element in the deflecting position until a defined force is exceeded. The securing element is dimensioned so that with the forces occurring during normal use the clamping function, i.e. a displacement of the clamping element into the clamping position, is not triggered. Hence regular operation of the plug-in tongue is ensured.

The securing element can be a spring element, for example, which acts on the deflecting element in the deflecting position. The spring force of this spring element is dimensioned so that only when a defined force of the spring element is exceeded a reversible movement of the clamping element into the clamping position is possible. By such spring element the clamping element is moreover returned to the home position after a case of restraint so that subsequently the webbing is released again.

The spring element can be made of plastic, especially of hard rubber, which can be reversibly compressed by the clamping element.

The securing element can also be a securing pin, for example, preventing the clamping element from moving in the home condition. The securing pin includes a predetermined breaking point which breaks or shears and releases the clamping element when a defined force acts on the securing pin.

The deflecting element preferably includes a surrounding injection molding, especially made of plastic material, enclosing the deflecting portion at least in portions, wherein the webbing passage can be formed by the surrounding injection molding at least in portions. Optionally provided guiding passages for the clamping element can equally be formed by the injection molding such as a seat for the securing element it is imaginable, for example, that the securing element is pre-mounted at the clamping element or at the plug-in tongue prior to injection molding and is subsequently completely or partly surrounded by injection molding.

BRIEF DESCRIPTION OF THE DRAWINGS

Further advantages and features will be resulting from the following description in combination with the enclosed drawings in which.

DESCRIPTION

Figure 1:
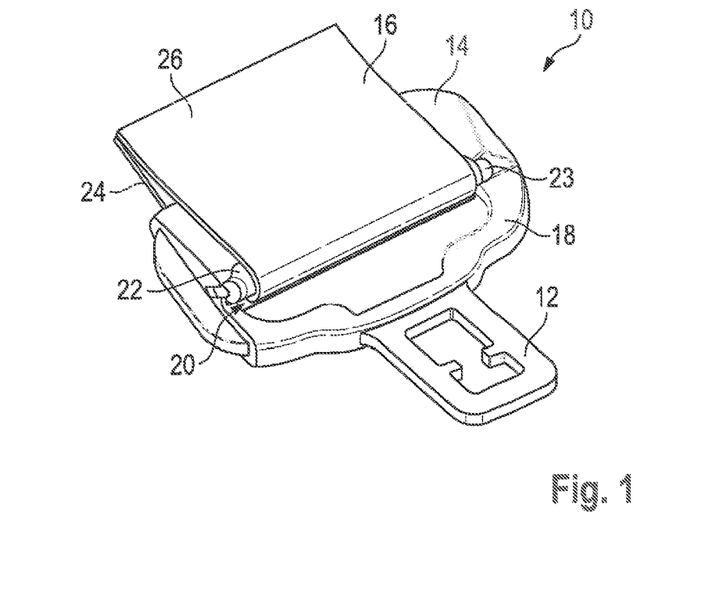
FIG. 1 shows a perspective view of a plug-in tongue according to the invention.
Figure 2:
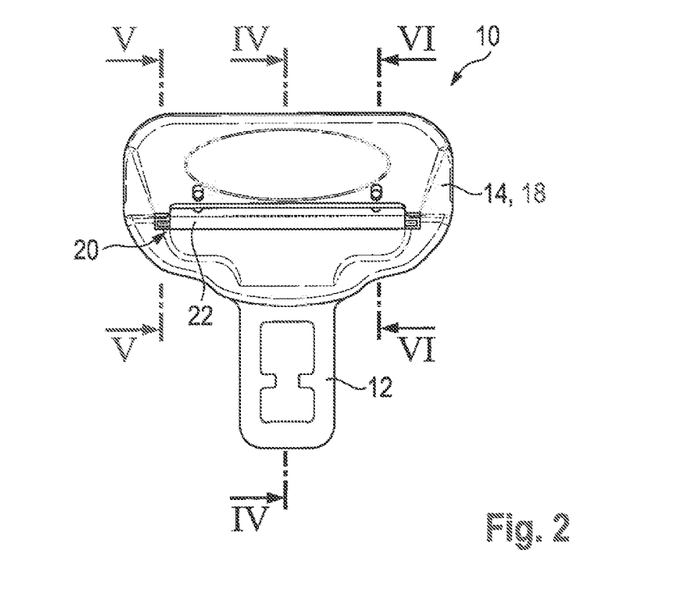
FIG. 2 shows a second view of the plug-in tongue from FIG. 1.

In FIGS. 1 and 2 a plug-in tongue 10 for a seat belt in a vehicle is illustrated. The plug-in tongue 10 includes an inserting portion 12 adapted to be inserted in a belt buckle and to be locked in the latter as well as a deflecting portion 14 which can be threaded onto a webbing 16 and can deflect the webbing (cf. FIG. 1). The deflecting portion 14 includes a surrounding injection molding 18 made of plastic material which completely encloses the deflecting portion 14.

Figure 3:
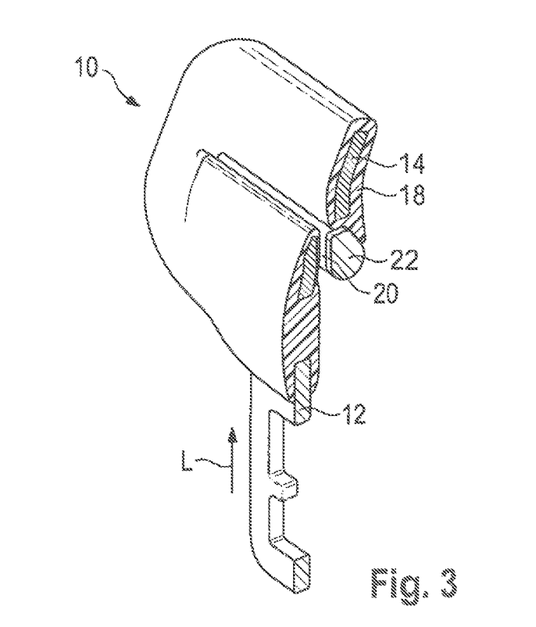
FIG. 3 shows a sectional view across the plug-in tongue from FIG. 1.

As is illustrated especially in FIGS. 3 and 4, a webbing passage 20 through which the webbing 16 is guided as well as a clamping element 22 the function of which shall be explained in the following is provided at the deflecting portion 14.

The webbing 16 is deflected in U-shape by the deflection fitting, the webbing 16 being guided with a clamping portion 23 around the clamping element 22 and through the webbing passage. The clamping portion 23 subdivides the webbing 16 into a first portion 24 and a second portion 26, the first portion 24 being guided round the pelvis region of a vehicle occupant and the second portion 28 extending around the thorax of the vehicle body starting from the plug-in tongue.

Since in the home condition the webbing 16 can be drawn freely through the deflecting portion 14 of the plug-in tongue 10, in connection with a belt retractor an adaptation of the length of the two portions 24, 26 is possible so that the seat belt can be adjusted such that both portions 24, 26 are adjacent to the vehicle occupant. In this way, the vehicle occupant is reliably prevented from moving forward when the seat belt is locked.

Figure 4:
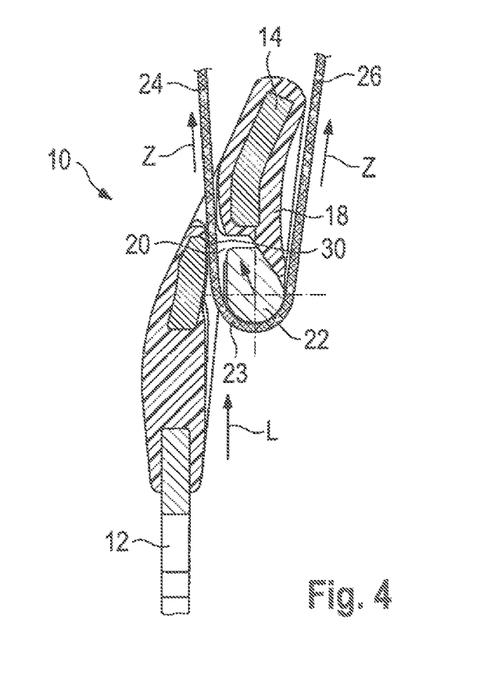
FIG. 4 shows a sectional view in the section IV-IV from FIG. 2.

As is evident especially in FIG. 4, the webbing passage 20 substantially extends in the longitudinal direction L of the plug-in tongue 10. The portions 24, 26 of the webbing 16 extend at an acute angle with respect to the longitudinal direction L, in particular at an angle of less than 45° away from the plug-in tongue 10.

Figure 5:
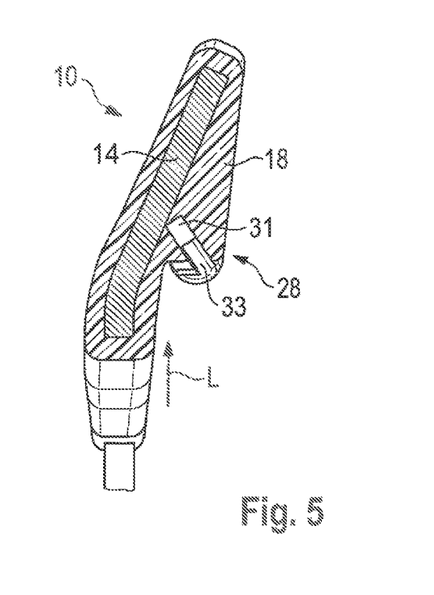
FIG. 5 shows a sectional view in the section V-V from FIG. 2.
Figure 6:
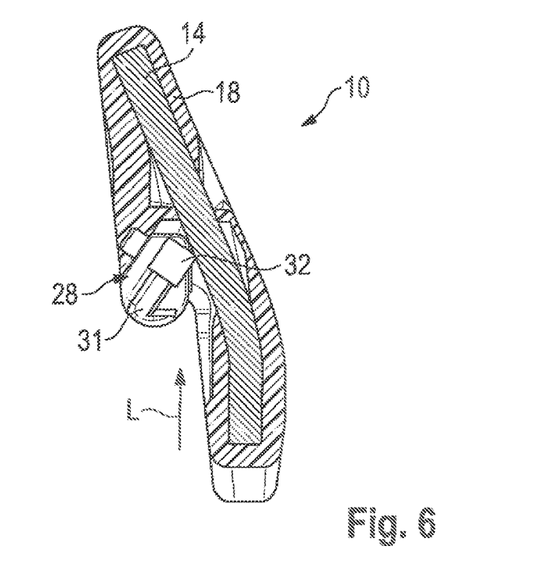
FIG. 6 shows a sectional view in the section VI-VI from FIG. 2.

The clamping element 22 is guided laterally in guides 28 (FIGS. 5 and 6) and can be displaced at an acute angle, especially an angle of less than 45°, from a home position shown in FIGS. 4 to 6 approximately in the longitudinal direction L into a clamping position.

The guide 28 is formed by two guiding passages 31 which are provided in the surrounding injection molding 18 and into which projections 33 of the clamping element 22 are protruding. Furthermore, at the guide 28 spring elements 32 are provided for acting on foe clamping element 22 in the home position shown in FIGS. 4 to 6.

The spring elements 32 are made of plastic material, especially of hard rubber, so that they can be reversibly compressed. It is also imaginable, however, that other spring elements known from prior art, especially coil springs, are used.

In the home position the webbing 18 can be moved freely through the webbing gap 20 and around the clamping element 22 so that the plug-in tongue 10 is freely movable on the webbing 16.

If, in the case of restraint the tensile force Z in the webbing 16 and, resp., in the two portions 24, 26 (FIG. 4) is higher than the spring force of the spring elements 32 retaining the clamping element 22 in the home position, the clamping element 22 being wrapped around by the webbing 16 is moved against the spring force of the spring elements 32 in the guides 28 into the clamping position in which the clamping element 22 clamps the webbing 16 against the wall 30 of the webbing passage 20.

The webbing 16 is fixed at this position of the clamping element 22 to the plug-in tongue 10. Consequently, a shortening of the first portion 24 and thus a constriction of the first portion 24 laid around the pelvis by a forward displacement of the thorax and the lengthening of the second portion 26 resulting therefrom are reliably excluded.

Unlike in the state of the art, the clamping element 22 is thus not displaced by friction between the webbing 16 and the clamping element 22, but the clamping element is directly drawn into the clamping position by the webbing 16 and, resp., the loop by which the webbing 16 is laid around the clamping element 22.

Since the clamping element 22 is displaced in the longitudinal direction L and thus substantially in the direction of action of the tensile forces Z in the webbing, when the tensile force 2 acting on the webbing 16 is increased and, resp., when a defined threshold of the tensile force Z is exceeded, the clamping element 22 is directly displaced in the longitudinal direction L into the clamping position.

Figure 7:
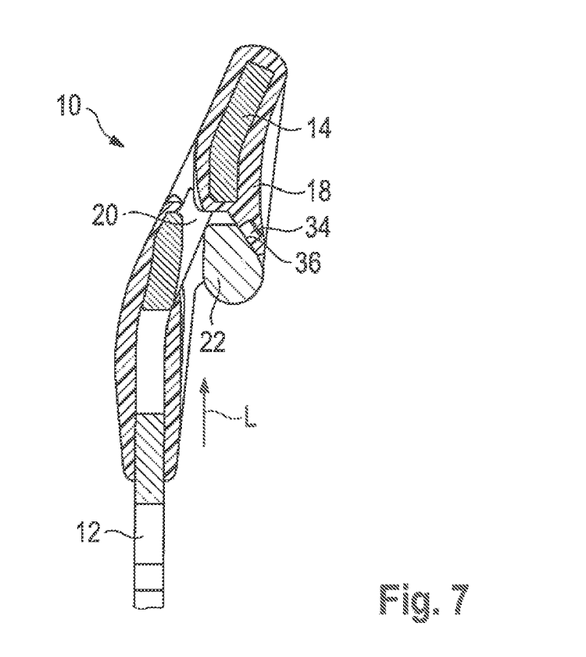
FIG. 7 shows a sectional view across a second embodiment of a plug-in tongue according to the invention.
Figure 8:
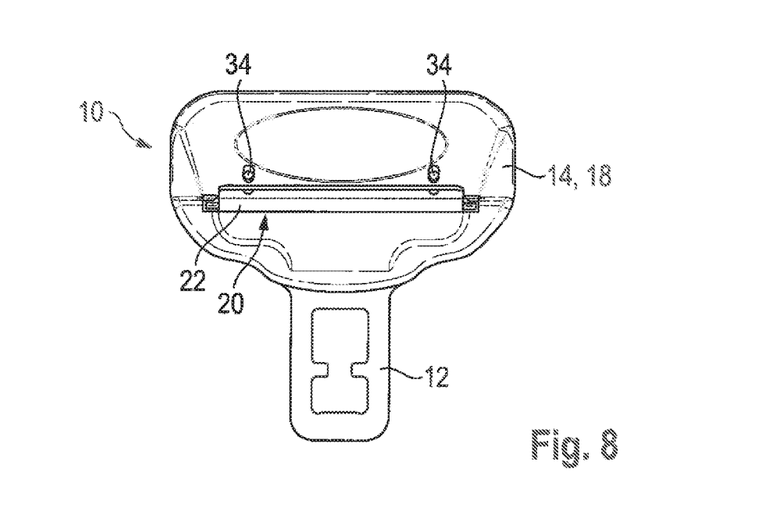
FIG. 8 shows a perspective view of the plug-in tongue from FIG. 7.
Figure 9:
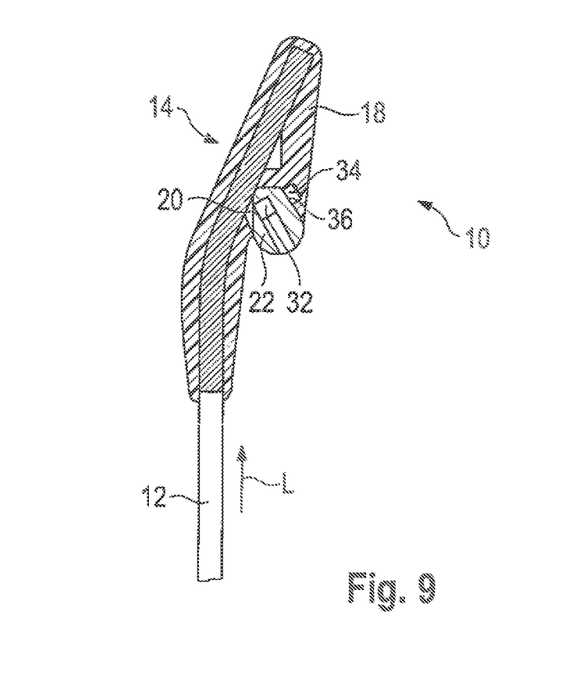
FIG. 9 shows a detailed view of the plug-in tongue from FIG. 7.

A second embodiment of a plug-in tongue according to the invention is shown in FIGS. 7 to 9. The structure of this plug-in tongue 10 substantially corresponds to the plug-in tongue 10 shown in FIGS. 1 to 6. The securing element is not formed by a spring element 32 in this case, however, but by two securing pins 34.

The securing pins 34 are retained in the surrounding injection molding 18, and are especially embedded in the same (cf. FIGS. 8 and 9). The securing pins 34 are arranged substantially perpendicularly to the displacing direction of the clamping element 22 and extend by one extremity into a bore in the clamping element 22. At the transition between the surrounding injection molding 18 and the clamping element 22 the securing pins 34 include a predetermined breaking point 36.

The clamping element 22 is retained in the home position and, resp., is prevented from moving from the home position into a clamping position by said securing pins.

When a defined force is exceeded, the securing pins 34 are shorn at the predetermined breaking point 36 so that the clamping element 22 can be displaced into the clamping position.

Figure 10:
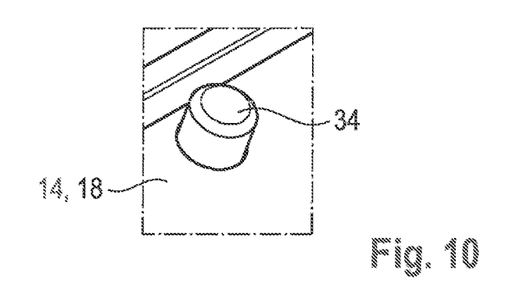
FIG. 10 shows a sectional view across a third embodiment of a plug-in tongue according to the invention.
Figure 11:
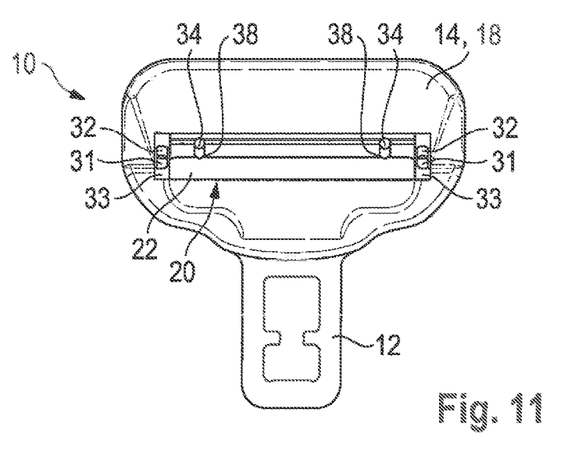
FIG. 11 shows a second view of the plug-in tongue from FIG. 10.
Figure 12:
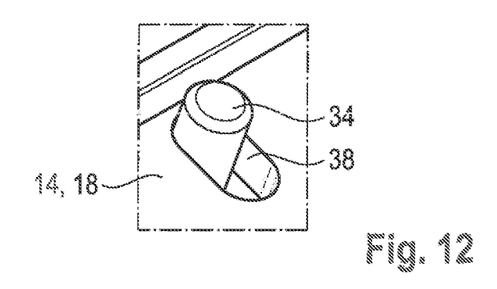
FIG. 12 shows a detailed view of the plug-in tongue from FIG. 11.

A third embodiment of a plug-in tongue 10 according to the invention is shown in FIGS. 10 to 12. As in the embodiment illustrated in FIGS. 1 to 6, in this embodiment spring elements 32 are provided which act on the clamping element 22 in the home position.

In addition, two securing pins 34 are provided, each of which is anchored in the clamping element 22 and is guided at the deflecting portion 22 in a groove 38 provided in the surrounding injection molding 18 and extending in the direction of the guides 28.

The grooves 38 in connection with the spring element 32 enable limited movement of the clamping element 22 in the case of low tensile forces Z. In this way, reversible clamping of the webbing 16 and thus fixing of the webbing 16 to the plug-in tongue 10 with lower clamping force is possible in the case of low impact forces. If the tensile force Z subsides, the clamping element 22 is returned to the home position by the spring element 32.

This embodiment offers the advantage that a dynamic clamping of the webbing is possible. The clamping force increases with an increasing tensile force Z, the increase in the clamping force being dependent on the hardness of the spring element 32. In addition, a repeated reversible movement of the clamping element 22 into the locking position is possible, as the securing pins 34 are not sheared.

Alternatively, it is also possible in which embodiment that the securing pins 34 are sheared, when a defined higher tensile force Z is exceeded, and the clamping element 22 is displaced further into the locking position in which the webbing 16 is complete clamped.

In all illustrated embodiments the clamping element 22 is displaced substantially in the longitudinal direction or at an acute angle with respect to the longitudinal direction of the plug-in tongue 10 so that the webbing 16 which is substantially deflected by 180° at the clamping element 22 can draw the clamping element 22 in the longitudinal direction L and/or in the direction of action of the tensile forces Z on the webbing 16 and/or at an acute angle with the same, when the tensile force acting on the webbing 16 increases.

The webbing passage 20 through which the webbing 16 is guided is equally arranged substantially in the longitudinal direction L of the plug-in tongue 10 and/or at an acute angle with the same so that the webbing is guided away from the plug-in tongue 10 such that the direction of action of the force F extends substantially in the displacing direction of the clamping element 22 and/or at an acute angle with the same.

Even if, after leaving the webbing passage 20, the webbing 16 is deflected into a different direction, it is ensured by the webbing passage 20 that the webbing is guided in the area of the clamping element substantially in the longitudinal direction L or at an acute angle with the latter so that the webbing 16 can displace the clamping element 22 in the longitudinal direction L.

The invention claimed is:

1. A plug-in tongue for a seat belt, comprising:
    an inserting portion adapted to be inserted in a belt buckle;
    a deflecting portion for a webbing, the deflecting portion including a webbing passage through which the webbing is guided, a clamping element for the webbing, and at least one guide for the clamping element, the clamping element being displaceable along the at least one guide between a home position in which the webbing is freely movable and a locking position in which the clamping element is displaced against a wall of the webbing passage such that the webbing is clamped between the clamping element and the wall of the webbing passage; and
    at least one securing element for retaining the clamping element in the home position until a defined force is exceeded, the at least one securing element including at least one securing pin anchored in the clamping element and guided at the deflecting portion in a corresponding groove;
    wherein the clamping element is directly drawn into the locking position by a loop of the webbing which is laid around the clamping element.

2. The plug-in tongue according to claim 1, wherein the guide for the clamping element is formed by guiding passages extending at an acute angle with at least one of the webbing passage and a longitudinal direction of the plug-in tongue, the webbing passage substantially extending in the longitudinal direction of the plug-in tongue or at an acute angle with the longitudinal direction of the plug-in tongue.

3. The plug-in tongue according to claim 1, wherein the at least one securing element further includes a spring element which loads the clamping element into the home position.

4. The plug-in tongue according to claim 3, wherein the spring element is made of plastic material.

5. The plug-in tongue according to claim 4, wherein the spring element is made of hard rubber.

6. The plug-in tongue according to claim 1, wherein the at least one securing pin has a predetermined breaking point.

7. The plug-in tongue according to claim 1, wherein the deflecting portion includes a surrounding injection molding that encloses the deflecting portion wherein the webbing passage is at least partially formed by the surrounding injection molding.

8. The plug-in tongue according to claim 7, wherein the injection molding is made of plastic material.

9. The plug-in tongue according to claim 7, wherein the at least one guide is formed by guiding passages provided in the injection molding and extending at an acute angle with at least one of the webbing passage and a longitudinal direction of the plug-in tongue, the webbing passage substantially extending in the longitudinal direction of the plug-in tongue or at an acute angle with the longitudinal direction of the plug-in tongue.

10. The plug-in tongue according to claim 9, wherein the groove is provided in the injection molding and extends in the direction of the at least one guide.

11. The plug-in tongue according to claim 9, wherein the clamping element has projections that protrude into the guiding passages to displace the clamping element along the at least one guide between the home position and the locking position.

12. The plug-in tongue according to claim 1, wherein the webbing passage substantially extends in a longitudinal direction of the plug-in tongue or at an acute angle with the longitudinal direction of the plug-in tongue, and the clamping element is displaceable from the home position into the locking position at an acute angle of less than 45° with at least one of the webbing passage and the longitudinal direction of the plug-in tongue.

* * * * *